United States Patent [19]

Haruta et al.

[11] Patent Number: 4,655,835

[45] Date of Patent: Apr. 7, 1987

[54] PROCESS FOR EVALUATING THE SOLUBILITY OF A COLORANT

[75] Inventors: Masahiro Haruta, Funabashi; Masatsune Kobayashi; Tokuya Ohta, both of Yokohama, all of Japan

[73] Assignee: Canon Kabushiki Kaisha, Tokyo, Japan

[21] Appl. No.: 763,878

[22] Filed: Aug. 8, 1985

Related U.S. Application Data

[63] Continuation of Ser. No. 490,732, May 2, 1983, abandoned.

[30] Foreign Application Priority Data

Mar. 5, 1983 [JP] Japan ................................. 58-35254

[51] Int. Cl.⁴ ............................................. C09D 11/02
[52] U.S. Cl. ......................................... 106/20; 106/22; 252/408.1; 424/2; 424/7.1
[58] Field of Search ................ 106/20, 22; 252/408.1; 424/2, 7.1

[56] References Cited

U.S. PATENT DOCUMENTS

| | | | |
|---|---|---|---|
| 3,846,141 | 11/1974 | Ostergren et al. | 106/22 |
| 4,024,096 | 5/1977 | Wachtel | 106/22 |
| 4,153,467 | 5/1979 | Yano et al. | 106/20 |
| 4,165,399 | 8/1979 | Germonprez | 427/264 |
| 4,170,482 | 10/1979 | Mansukhani | 106/20 |
| 4,269,627 | 5/1981 | Hwang | 106/22 |
| 4,272,538 | 6/1981 | Makovec et al. | 424/250 |
| 4,285,727 | 8/1981 | Uehara et al. | 106/22 |
| 4,353,988 | 10/1982 | Couse et al. | 435/30 |
| 4,377,697 | 3/1983 | Fellner et al. | 548/336 |

OTHER PUBLICATIONS

B. Ames, et al., *Mutatron Research,* 31 (1975) 347-64.

*Primary Examiner*—Amelia B. Yarbrough
*Attorney, Agent, or Firm*—Fitzpatrick, Cella, Harper & Scinto

[57] ABSTRACT

In a recording liquid comprising, as essential components, a colorant in an amount necessary to image formation, water, and a water-miscible organic solvent, said recording liquid is characterized in that the total number of colonies in the Ames test thereof is not more than four times that of the control test using sterilized water.

14 Claims, No Drawings

PROCESS FOR EVALUATING THE SOLUBILITY OF A COLORANT

This application is a continuation of application Ser. No. 490,732, filed May 2, 1983, now abandoned.

BACKGROUND OF THE INVENTION

1. Field of the Invention

This invention relates to a recording liquid suitable for ink-jet recording by ejecting droplets through orifices of a recording held as well as for recording by use of usual writing tools.

2. Description of the Prior Art

Ink-jet recording generates less noise and permits high speed recording on plain paper without requiring any particular fixing treatment, so that various types of ink-jet systems are investigated energetically.

Recording liquid for use in the ink-jet system is demanded to fulfill the following requirements: (1) its physical properties such as viscosity and surface tension are within proper respective ranges; (2) it does not clog fine orifices for discharging; (3) it gives recording images with clear color and with sufficiently high optical density; and (4) it does not make any change in its physical properties or deposit solid matter during storage. In addition, the following properties are requested: (5) recording can be performed on any of recording media such as paper and the like; (6) it can be fixed on recording media at high rates; (7) it gives images which are excellent in resistance to water, solvent (in particular, alcohol resistance), light, and abrasion and have a high degree of resolution; and (8) it is innocuous to human body.

On the other hand, when used for recording by means of conventional writing tools such as fountain pens, felt pens, and the like, recording liquid is requested to have similar properties as in the case of ink-jet recording, in particular to be excellent in solution stability (the above requirements (2), (4) and such) since the supplement of recording liquid to pen points are accomplished by making use of capillarity. Accordingly, a recording liquid which fulfills the requirements in ink-jet applications can also be used in conventional writing tool applications.

Recording liquid used for ink-jet recording is composed basically of a dye for recording purposes and its solvent. The above noted properties of recording liquid are much affected by properties proper to the ingredient dye and by the solvent composition. It is therefore very important in the art to select a dye and a solvent composition so as to provide the recording liquid with the above properties requested.

The solubility of the ingredient colorant in vehicle materials is of great importance, that is, a sufficient solubility of the colorant in water and also in a water-miscible organic solvent such as a wetting agent is essential for the recording liquid to maintain a good anti-clogging property and a high storage stability.

SUMMARY OF THE INVENTION

An object of this invention is to provide a recording liquid for ink-jet recording and writing by use of writing tools which is excellent in the solubility of its ingredient colorant and maintains a high solution stability during storage.

Another object of this invention is to provide a recording liquid which is harmless to human body, does not clog the discharging orifice when used for inkjet recording and can be smoothly supplied to pen points when used for writing by means of writing pens.

Thus, this invention provide a recording liquid comprising, as essential components, a colorant in an amount necessary to image formation, water, and a water-miscible organic solvent, said recording liquid being characterized in that the total number of colonies in the Ames test of the recording liquid is not more than four times that of the control test using sterilized water.

DETAILED DESCRIPTION OF PREFERRED EMBODIMENTS

It has been found that an intimate relationship exists between the result of the Ames test (a mutation activity test generally known as a method of evaluating toxicity) of recording liquid and the storage solution stability thereof, and that the storage solution stability rapidly falls when the Ames test value exceeds a specific value even though this specific value is not problematic in toxicity.

The Ames test in this invention is conducted in accordance with the following procedure:

The strain used in the Ames test is a histidine-requirement (His−) strain incapable of synthesizing histidine, belonging to the genus Salmonella typhimurium. The His− strain, when placed under the action of a toxic sample, reverts to a histidine-non-requirement (His+) strain (revertant to histidine prototrophy). The mutagenesis of the test sample is determined by counting the number of colonies of this revertant His+ strain. At present, TA1535, TA1537, TA100 and TA98 among the strains used for the Ames test are generally recommended; however, a good correlation is observed between the test value and the solution stability of recording liquid when TA98 is used. Consequently, TA98 is used for the Ames test in this invention.

In the Ames test, two tests are generally made in combination, one being a direct test in which the test sample is allowed to act as such on strain bodies and the other being a metabolism activation test in which a drug metabolism activating enzyme (so-called S-9 Mix) obtained from the liver of rats or the like is incorporated for the purpose of approximating the drug metabolizing system of the microorganism to that of the mammal; but the former direct test only is carried out in this invention by reason that results of the direct test generally indicate a more clear distinction between the sample and control and a better correlation to the storage solution stability.

Referring to the Ames test procedure, detailed description has been given, for example, in Mutat. Res., 31, 347(1975). Accordingly, the procedure is briefly described below.

The bacterial tester strain-containing liquid is prepared by subjecting a medium containing a nutrient broth (8 g/l) and sodium chloride (5 g/l) to a high-pressure steam sterilization, inoculating the medium with TA98, and shaking the medium at 37° C. for 16 hours to grow the strain.

A suitable agar plate medium is prepared by high-pressure steam sterilization of the composition:

| | |
|---|---|
| Distilled water | 900 ml |
| Volgel-Bonner's minimal medium liquor | 100 ml |
| Glucose (2.0%) | 20 g |
| Agar (1.5%) | 15 g | and taking in part about 25 ml of the sterilized composition in a sterilized Petri dish to solidify it. The Volgel-Bonner's minimal medium liquor is prepared by dissolving 2 g of $MgSO_4.7H_2O$, 20 g of citric acid monohydrate, 100 g of dipotassium hydrogenphosphate, and 35 g of $NaNH_4HPO_4.4H_2O$ in distilled water, and adjusting the total volume to 1000 ml.

Using the bacterial tester strain-containing liquid and the agar medium, the Ames mutation activity test of the sample is conducted according to a so-called pre-incubation method as follows:

The above bacterial tester strain-containing liquid (0.1 ml), the solution (0.1 ml) of sample to be tested or the control liquid (distillated and sterilized water) (0.1 ml), and a 100 mM sodium phosphate buffer solution (pH 7.4, 0.5 ml) are added to 2 ml of a soft agar solution containing 0.7% by weight of agar, 0.6% by weight of NaCl, 0.05 mM of L-hystidine, and 0.05 mM of biotin which is put in a sterilized small test tube kept at 45° C.. The liquid is well mixed and then shaken in an incubator at 37° C. for about 20 minutes to grow the strain. The liquid in the test tube is poured onto the agar plate medium, and the Petri dish, after solidification of the soft agar, is placed in the dark at 37° C. for 48 hours, and the number of the colonies (revertants to histidine prototrophy) is counted.

When the number of the colonies determined in the Ames test thus carried out is not more than four times that determined in the control Ames test, the sample recording liquid is excellent in storage solution stability and of course intoxic to human body. Preferably, the number of the colonies for the recording liquid is not more than triple that for the control.

The ingredient colorant in the recording liquid of this invention plays a role as the coloring component of recording liquid, and is categorized generally as a dye or pigment. The colorant content in the recording liquid is in the range necessary to image formation. This content, though dependent upon the water content, the kinds and contents of the water-miscible organic solvents and the like contained, and requested properties of recording liquid, is required in the range of 1 to 20% by weight, and is desirably in the range of 1 to 10%, preferably 1-6%, by weight.

The recording liquid of this invention contains water and a water-miscible organic solvents as essential components for dissolving the component colorant.

Water-miscible solvents for this purpose include for example, $C_1$-$C_4$ alkyl alcohols such as methanol, ethanol, n-propanol, isopropanol, n-butanol, sec-butanol, tert-butanol, and isobutanol; amides such as dimethylformamide, dimethylacetamide, and the like; ketones or keto-alcohols such as acetone, diacetone alcohol, and the like; ethers such as tetrahydrofuran, dioxane, and the like; polyalkylene glycols such as polyethylene glycol, polypropylene glycol, and the like; alkylene glycol having 2-6 carbon atoms in the alkylene group such as ethylene glycohol, propylene glycol, butylene glycol, triethylene glycol, 1,2,6-hexanetriol, thiodiglycol, hexylene glycol, diethylene glycol, and the like; glycerol; lower alkyl ethers of polyhydric alcohols such as ethylene glycol methyl ether, diethylene glycol methyl (or ethyl) ether, triethylene glycol monomethyl (or monoethyl) ether, and the like; and nitrogen-containing heterocyclic ketones such as N-methyl-2-pyrrolidone, 1,3-dimethyl-2-imidazolidinone, and the like.

Among these various water-miscible organic solvents, polyhydric alcohols such as diethylene glycol and lower alkyl ethers of polyhydric alcohols such as triethylene glycol monomethyl (or monoethyl) ether are preferable. Polyhydric alcohols are particularly preferable because they have a great wetting effect for preventing the clogging of the discharging orifices due to the deposition of the colorant by evaporation of the water contained in the recording liquid. Nitrogen-containing heterocyclic ketones such as N-methyl-2-pyrrolydone and the like are also taken as an example of particularly preferable solvents because they are much effective as a so-called solubilizer for improving markedly the solubility of the colorant in the solvent.

The content of the water-miscible organic solvent in the recording liquid is generally 5-95%, preferably 10-80%, and more preferably 20-50%, by weight based on the total weight of recording liquid.

The water content, though dependent upon the kind and content of the solvent and desired properties of the recording liquid, is selected from a wide range of generally 10-90%, preferably 10-70%, and more preferably 20-70%, by weight based on the total weight of recording liquid.

The recording liquid of this invention formulated from these components is excellent as it is, having balanced recording characteristics (responsiveness to signals, stability of droplet formation, discharge stability, long-hour continuous recordability, and discharge stability after a long period of rest time), storage stability, solution stability of the colorant, fixability onto recording media such as paper and the like, and light resistance, weather resistance, water resistance, and alcohol resistance, of the image formed. For further improvements of these characteristics, various additives hitherto known may be incorporated.

Such additives include, for example, viscosity regulators such as poly(vinyl alcohol), celloses, and other water-soluble resins; various cationic, anionic, and nonionic surfactants; surface tension regulators such as diethanolamine, triethanolamine, and the like; and pH regulators employing buffers.

In order to prepare a recording liquid for use in the method of recording by electrical charging of recording liquid droplets, a resistivity regulator is incorporated such as an inorganic salt, e.g. lithium chloride, ammonium chloride, or sodium chloride. Further, urea or thiourea is suitably used for improving the water retention at discharging tips. In the case of a recording liquid to be discharged by the action of thermal energy, its thermal properties (e.g. specific heat, thermal expansion coefficient, heat conductivity, etc.) are regulated in certain cases.

Although suitable in particular for ink-jet recording applications, the recording liquid of this invention can also be used favorably for writing applications by means of conventional writing tools such as fountain pens, felt pens, and the like.

This invention will be illustrated in more detail with reference to the following preparation examples, examples, and comparative examples:

PREPARATION EXAMPLE 1

(Reaction 1)

In a 4-liter 3-necked flask was put 0.28 mole of 2-naphthylamine-8-sulfonic acid and was gradually added dropwise 0.1N aq. NaOH so as not to raise the temperature over 40° C. until the pH reached 7. Then, 600 g of ice was added, and after the temperature dropped to 10° C., reaction was conducted by adding 100 ml of 37% conc. HCl and 85 ml of 30% aq. NaNO$_2$, with stirring at 18° C. for 2 hours. On the other hand, 0.34 mole of m-toluidine was put in a 5-liter 3-necked flask, and then 500 ml of distilled water and 50 ml of 37% conc. HCl were added. The mixture was heated to 50° C. to dissolve the toluidine, then was cooled to 30° C. with an ice-cold water bath, and reaction was conducted by adding the reaction mixture prepared in the 2-liter 3-necked flask, at 20° C. for 30 minutes. Then, 500 ml of 20% aq. sodium acetate was added and the mixture was stirred at room temperature for about 20 hours. Then, 125 ml of 37% conc. HCl was added to acidify the mixture, the resulting mixture was filtered by using a qualitative filter paper, and the filter cake was dried in a vacuum desiccator.

(Reaction 2)

The product obtained by reaction 1 was all put in a 2-liter beaker, one liter of distilled water and 60 ml of 40% aq. NaOH were added, the mixture was heated at 40°-50° C. to dissolve the product, and 85 ml of 30% aq. NaNO$_2$ was added. On the other hand, 180 ml of 37% conc. HCl and 600 g of ice were put in a 4-liter 3-necked flask, the formerly prepared content in the beaker was gradually added, and the mixture was stirred for 1 hour. The reaction product was filtered by using a qualitative filter paper, the filter paste was put in a 2-liter beaker, and 300 g of ice and 500 ml of distilled water were added to dissolve the product with stirring. Besides this, 0.32 mole of 1-amino-2-ethoxynaphthalene-6-sulfonic acid was put in a 4-liter, 3-necked flask, one liter of distilled water and 0.1N aq. NaOH were added dropwise up to pH 7, and the sulfonic acid was completely dissolved at 40° C.. The solution was cooled to 20°-25° C., the above solution of filter paste was added dropwise, and further 450 ml of 20% aq. sodium acetate was added. After 7-hour stirring, 37.5 g of Na$_2$CO$_3$ was added, and the mixture was heated for 1-2 hours up to 60° C.. About one liter of 10% aq. NaCl was added for salting out, the separated matter was filtered by using a qualitative filter paper, and the filter cake was dried in a vacuum desiccator.

(Reaction 3)

The product obtained by reaction 2 was all put in a 2-liter 3-necked flask, 600 ml of distilled water and 500 ml of 50% acetic acid were added, and the mixture was stirred so that the temperature would not exceed 30° C.. After cooling below 20° C., 100 ml of 30% aq. NaOH was added, and the mixture was stirred for 7 hours to prepare a liquid (designated as liquid A).

On the other hand, 0.28 mole of H acid was put in a 2-liter 3-necked flask, 500 ml of distilled water was added to dissolve it, and 32 ml of 40% aq. NaOH and 17 g of Na$_2$CO$_3$ were further added. After the temperature was raised up to 70° C., 50 g of acetic anhydride was added, and the mixture was stirred until it cooled to room temperature. The resulting solution was added to a mixture of 1.5 liters of pyridine and 2 Kg of ice contained in a 10-liter 3-necked flask and was thoroughly mixed. Further, liquid A was added and mixed at 60° C. for 1 hour, about 2 liters of 10% aq. NaCl was added for salting out, and the separated matter was filtered by using a qualitative filter paper to give a filter cake.

(Purification)

The filter cake (10 g) and methyl Cellosolve (300 ml) were mixed by stirring in a beaker for about 3 hours to dissolve the cake. The solution was filtered with a qualitative filter paper No. 2 (mfd. by Toyo Roshi Co., Ltd.), and the filtrate was evaporated to dryness, giving a dye (designated as dye A).

PREPARATION EXAMPLE 2

Dye B was prepared by repeating the procedure of Preparation Example 1 except that the same molar quantity of naphthionic acid was used in place of 2-naphthylamine-8-sulfonic acid in reaction 1 and the same molar quantity PR acid was used in place of H acid in reaction 3.

PREPARATION EXAMPLE 3

Dye C was prepared by repeating the procedure of Preparation Example 1 except that the same molar quantity of 1-naphthylamine-5-sulfonic acid was used in place of 2-naphthylamine-8-sulfonic acid in reaction 1.

PREPARATION EXAMPLE 4

Dye D was prepared by repeating the procedure of Preparation Example 1 except that the same molar quantity of Cleve's acid-7 was used in place of 2-naphthylamine-8-sulfonic acid in reaction 1 and the same molar quantity of K acid was used in place of H acid in reaction 3.

PREPARATION EXAMPLE 5

In a 4-liter 3-necked flask was put 0.25 mole of sulfanilic acid together with 800 ml of distilled water and was dissolved completely at 70° C. Then, 80 ml of 37% conc. HCl and 500 g of ice were added, and when the liquid temperature dropped to 18°-20° C., 25 g of 23% aq. NaNO$_2$ was added and mixed for 1 hour. Then, 0.28 mole of 1,7-Cleve's acid in paste form and further 450 ml of 20% aq. sodium acetate were added, and the mixture was stirred at 18° C. for 10 hours. After 80 ml of 40% aq. NaOH was added, the temperature was raised to 25° C. and 900 g of NaCl and 30 g of 23% aq. NaNO$_2$ were added. Further, 250 ml of 37% conc. HCl was added, and the reaction mixture was filtered with a qualitative filter paper. The filter paste obtained was mixed with 300 ml of distilled water and 300 g of ice.

On the other hand, 0.25 mole of RR acid together with 500 ml of distilled water was put in a 4-liter 3-necked flask and was completely dissolved by adding 0.1N aq. NaOH up to pH 7. After cooling of the mixture to 0° C. by adding 1 Kg of ice, pyridine and then the formerly obtained paste were added, and the mixture was stirred for 10 hours. A large amount of NaCl was added for salting out, and, after stirring 2 hours, the mixture was filtered with a qualitative filter paper. The resulting filter cake was purified in the same manner as in "Purification" of Preparation Example 1, to give a dye (dye E).

PREPARATION EXAMPLE 6

A mixture of 400 parts (hereinafter, all "parts" are by weight) of chlorosulfonic acid and 50 parts of copper phthalocyanine was heated with stirring at 125°–130° C. for 4 hours. After cooling on standing, the product mixture was gradually added dropwise into a mixture of 500 parts of water and 2000 parts of ice. The mixture was filtered, and the filter cake was washed with cold water. The filter cake was neutralized by adding it to a 5% solution of equivalent amount of NaOH, the solvent was evaporated, the residue was dissolved in Cellosolve, the solution was filtered with a qualitative filter paper No. 2 (mfd. by Toyo Kagakusangyo Co., Ltd.), and the solvent was evaporated from the filtrate. Thus, a sodium salt of copper phthalocyanine having sulfo substituents was obtained (dye F).

PREPARATION EXAMPLE 7

A mixture of 150 parts of 4-sulfophthalic acid, 135 parts of urea, 24 parts of cupric chloride, and 0.5 parts of ammonium molybdate was reacted by stirring together with 300 parts of trichlorobenzene at 200° C. for 2 hours. The product mixture was hot-filtered, and the filter cake obtained was treated in the same manner as in "Purification" of Preparation Example 1, to give a dye (dye G).

EXAMPLES 1–12 and COMPARATIVE EXAMPLES 1–14

Using dyes obtained in Preparation Examples 1–7 and commercial dyes, recording liquids were prepared respectively according to the following four formulations:

| Formulation I | |
|---|---|
| Glycerol | 30 parts by weight |
| N—Methyl-2-pyrrolidone | 10 parts by weight |
| Distilled water | 60 parts by weight |
| Dye | 1.5–4 parts by weight |
| Formulation II | |
| Ethylene glycol | 40 parts by weight |
| N—Methyl-2-pyrrolidone | 15 parts by weight |
| Distilled water | 45 parts by weight |
| Dye | 1.5–3 parts by weight |
| Formulation III | |
| Triethylene glycol monomethyl ether | 20 parts by weight |
| Glycerol | 10 parts by weight |
| N—Methyl-2-pyrrolidone | 10 parts by weight |
| Distilled water | 60 parts by weight |
| Dye | 0.8–4 parts by weight |
| Formulation IV | |
| Polyethylene glycol (M.W. 300) | 15 part by weight |
| Diethylene glycol | 15 part by weight |
| 1,3-Dimethyl-2-imidazolidinone | 10 part by weight |
| Distilled water | 60 part by weight |
| Dye | 0.8–2.5 part by weight |

Components of each formulation were thoroughly mixed together in a vessel to form a solution, which was then pressure-filtered through a Teflon filter of 1μ pore size. The filtrate was degassed in vacuo to be made up into recording liquid.

Compositions of the recording liquids prepared are summarized in Table 1. The Ames test, solution stability test, and ink-jet recording performance test were conducted on these recording liquids. The results are also shown in Table 1. The above tests and the evaluation of test results were made as follows:

(Ames test)

In accordance with the procedure described above, TA98 was cultivated in the presence of the sample recording liquid in the dark at 37° C. for 48 hours and the number of revertant colonies was counted. This number was compared with that of the control test.

(Solution stability test)

The sample recording liquid was allowed to stand in a sealed glass container at 60° C. for 6 months, and thereafter was pressure-filtered through a Teflon filter of 1μ pore size to examine whether a precipitate is present or absent and the amount of the precipitate if present. The evaluation criteria are as follows:
- −: No precipitate was found.
- +: A very small amount of precipitate was observed on the filter.
- ++: A relatively large amount of precipitate was observed on the filter.
- +++: A precipitate was observed in the glass container.

(Ink-jet recording performance test)

The ink-jet recorder used was provided with an on-demand type of recording head which discharges recording liquid through 50μ dia. orifices by the action of piezo oscillators (piezo oscillator driving voltage 80 V, its frequency 3 KHz). The sample recording liquid was supplied to this recorder and allowed to stand for 4 months under enviromental conditions of 20° C. and about 60% R.H. Then, recording was conducted for about 10 minutes. The evaluation criteria are as follows:
- O: Trouble-less recording was possible.
- X: Ink discharge often stopped.
- XX: Ink was not discharged.

(Image quality test)

Visual examination of image density was made on the letters printed in the above ink-jet recording test. The evaluation criteria as follows:
- O: The letters were sufficient in image density and easy to read.
- X: The letters exhibited low image density and were difficult to read.

TABLE 1

| | Composition of recording liquid | | | Result of Ames test | | | Solution stability test | Ink-jet recording performance test | Image quality test |
|---|---|---|---|---|---|---|---|---|---|
| | Colorant and Colorant Concentration | (wt part) | Formulation No. | Sample liquid | Control liquid | Ratio of sample to control | | | |
| Example No. | | | | | | | | | |
| 1 | Dye A | 4.0 | I | 67 | 64 | 1.0 | — | | |
| 2 | Dye A | 2.0 | I | 68 | " | 1.0 | — | | |
| 3 | Dye B | 2.5 | IV | 243 | " | 3.8 | — | | |
| 4 | Dye C | 3.0 | II | 76 | " | 1.2 | — | | |
| 5 | Dye C | 1.5 | II | 70 | " | 1.1 | — | | |

TABLE 1-continued

|  | Composition of recording liquid | | | Result of Ames test | | | Solution stability test | Ink-jet recording performance test | Image quality test |
| --- | --- | --- | --- | --- | --- | --- | --- | --- | --- |
|  | Colorant and Colorant Concentration | (wt part) | Formulation No. | Sample liquid | Control liquid | Ratio of sample to control | | | |
| 6 | Dye D | 3.0 | III | 134 | " | 2.1 | — | | |
| 7 | Dye E | 4.0 | III | 213 | " | 3.3 | — | | |
| 8 | Dye E | 2.0 | III | 180 | " | 2.8 | — | | |
| 9 | Dye F | 3.0 | IV | 83 | " | 1.3 | — | | |
| 10 | Dye F | 1.0 | IV | 72 | " | 1.1 | — | | |
| 11 | Dye G | 2.5 | II | 104 | " | 1.6 | — | | |
| 12 | Dye G | 1.5 | IV | 73 | " | 1.1 | — | | |
| Comparative Example No. | | | | | | | | | |
| 1 | C.I. Acid Black 107 | 3.0 | I | 524 | " | 8.2 | +++ | XX | — |
| 2 | C.I. Acid Black 107 | 1.5 | I | 480 | " | 7.5 | +++ | XX | — |
| 3 | C.I. Acid Black 52:1 | 2.0 | II | 391 | " | 6.1 | ++ | XX | — |
| 4 | C.I. Direct Black 19 | 1.5 | IV | 497 | " | 7.7 | +++ | XX | — |
| 5 | C.I. Direct Blue 236 | 1.5 | II | 322 | " | 5.0 | + | X | — |
| 6 | C.I. Direct Yellow 44 | 2.0 | I | 336 | " | 5.2 | + | X | — |
| 7 | C.I. Acid Yellow 59 | 2.0 | III | 405 | " | 6.3 | ++ | XX | — |
| 8 | C.I. Acid Yellow 59 | 0.8 | III | 369 | " | 5.7 | + | | X |
| 9 | C.I. Acid Yellow 114 | 1.5 | IV | 410 | " | 6.4 | ++ | XX | — |
| 10 | C.I. Acid Yellow 161 | 1.5 | IV | 288 | " | 4.5 | + | X | — |
| 11 | C.I. Acid Red 180 | 2.0 | I | 269 | " | 4.2 | ++ | X | — |
| 12 | C.I. Acid Red 214 | 1.5 | IV | 443 | " | 6.9 | +++ | XX | — |
| 13 | C.I. Acid Red 214 | 0.8 | IV | 358 | " | 5.6 | + | | X |
| 14 | C.I. Acid Red 315 | 1.5 | II | 295 | " | 4.6 | ++ | XX | — |

What we claim is:

1. Process for evaluating the solubility of a colorant in a recording liquid and the solution stability of the recording liquid having a predetermined composition, including a colorant in amounts necessary to image formation, water and a water-miscible organic solvent comprising:
   (a) conducting an Ames test on said recording liquid;
   (b) comparing the test results with a control liquid using sterilized water; and
   (c) determining the total number of colonies in said Ames test thereof which, to pass said evaluation, should not exceed four times that of the control liquid using sterilized water.

2. The evaluation process of claim 1, including providing a recording liquid wherein the Ames test conducted on said recording liquid yields a total number of colonies not more than three times that of the control test using sterilized water.

3. The evaluation process of claim 1, said process employing a colorant, present in amounts between 1 and 20% by weight.

4. The evaluation process of claim 1, said process employing a water-miscible organic solvent, present in amounts between 5 and 95% by weight.

5. The evaluation process of claim 1, said process employing water present in amounts between 5 and 95% by weight.

6. A process for preparing a recording liquid comprising: a colorant and a liquid medium, said liquid medium containing water and a water-miscible organic solvent, said process comprising the steps of (i) purifying said colorant; (ii) dissolving said purified colorant into said liquid medium to form a recording liquid (iii) conducting an Ames test on said recording liquid and (iv) selecting the recording liquid, providing that the total number of colonies in the Ames test thereof is not more than four times that of a control test using sterilized water.

7. The process for preparing a recording liquid of claim 6, including conducting said Ames test using a Salmonella TA98 bacterial strain.

8. The process for preparing a recording liquid of claim 7, including selecting the recording liquid such that the total number of colonies in the Ames test thereof is not more than three times that of said control.

9. The process for preparing a recording liquid of claim 7, including employing distilled water for use in the Ames test control.

10. The process for preparing a recording liquid according to claim 7, including dissolving said colorant in said liquid medium at a concentration between 1 to 20% by weight, based upon the weight of the recording liquid.

11. The process for preparing a recording liquid according to claim 7, including employing as said water-miscible organic solvent, a polyhydric alcohol or a lower alkyl ether thereof.

12. The process for preparing a recording liquid according to claim 7, including employing said water-miscible organic solvent in said liquid medium at a concentration between 5 to 95% by weight, based upon the weight of the recording liquid.

13. The process for preparing a recording liquid according to claim 7, including utilizing said water in said liquid medium at a concentration between 10 to 90% by weight, based upon the weight of the recording liquid.

14. The process for preparing a recording liquid according to claim 7, including utilizing as said water-miscible organic solvent in said liquid medium at least one nitrogen-containing heterocyclic ketone.

* * * * *